United States Patent [19]

Greenwood

[11] Patent Number: 4,504,698
[45] Date of Patent: Mar. 12, 1985

[54] COVER FOR ELECTRICAL RECEPTACLE
[75] Inventor: William S. Greenwood, Nutley, N.J.
[73] Assignee: Thomas & Betts Corporation, Raritan, N.J.
[21] Appl. No.: 365,887
[22] Filed: Apr. 6, 1982
[51] Int. Cl.³ .............................................. H02G 3/10
[52] U.S. Cl. ........................................ 174/66; 174/48
[58] Field of Search ............... 174/48, 49, 66, 117 FF, 174/53, 67; 339/121

[56] References Cited

U.S. PATENT DOCUMENTS

| D. 261,135 | 10/1981 | Horne | D13/30 |
|---|---|---|---|
| 2,738,892 | 3/1956 | Wiesmann | 174/48 X |
| 2,916,733 | 12/1959 | Hirsch | 174/67 |
| 3,756,447 | 9/1973 | Hadfield | 174/48 X |
| 3,845,234 | 10/1974 | Brenner | 174/67 |
| 3,876,821 | 4/1975 | Pringle | 174/53 |
| 3,949,155 | 4/1976 | Bourne | 174/55 |
| 4,240,688 | 12/1980 | Sotolongo | 174/48 X |
| 4,355,198 | 10/1982 | Gartland, Jr. | 174/66 |

Primary Examiner—A. T. Grimley
Assistant Examiner—D. A. Tone
Attorney, Agent, or Firm—Robert M. Rodrick; Salvatore J. Abbruzzese

[57] ABSTRACT

An electrical receptacle cover which can be movably secured to an electrical receptacle. The cover is constructed to have a deformable spring portion which will deflect and move with reference to the receptacle upon application of an external load against the cover. This deflection and movement will absorb the energy of the impact thereby reducing the load transferred to the receptacle and prevent damage thereto.

14 Claims, 7 Drawing Figures

COVER FOR ELECTRICAL RECEPTACLE

FIELD OF THE INVENTION

This invention relates to a protective cover for an electrical receptacle and more particularly to a receptacle cover which reduces the load transmitted to the receptacle as the result of external impact.

BACKGROUND OF THE INVENTION

In commercial or other buildings, round conductor wire is typically employed to supply electrical power to various points of use, as for example, for lighting and appliance uses. Electrical receptacles are usually placed at or near the area where the power is needed. Typically, these installations are made at the junction boxes which are part of an underfloor raceway system through which the electrical conductors are passed. These junction boxes are set into the floor surface and allow the receptacle to be mounted in a given orientation, at or near the same level as the floor, with the face of the receptacle in the same plane as the floor. As the receptacle is seated in the box below floor level, it is not subjected to side impact by movement of such objects as furniture, floor cleaners, foot traffic, etc.

However, with the advent of flat conductor cable (FCC) which is carried on top of the floor surface, electrical receptacles can no longer be placed in a junction box which is part of an underfloor raceway, as the FCC eliminates the need for such a raceway system. Therefore, it has become necessary to employ above the floor junction boxes to secure the receptacle. Normally, these junction boxes secure the receptacle therein in a fixed relative relation, with the receptacle mounted in a vertical position on the floor so that it lies in a plane perpendicular to that of the floor. The positioning of junction boxes in this manner is necessary since the use of conventional receptacles requires a transition to such receptacles by round wire from the flat cable. The vertical box comprises a housing or cover to protect the receptacle from the above-mentioned floor traffic. This housing is normally made of metal or other rigid material so as to prevent damage to the receptacle due to external load which may be applied thereto.

In U.S. patent applications Ser. Nos. 337,661 and 337,662, both filed on Jan. 7, 1982, and commonly assigned to the assignee of the present invention, improved FCC receptacles and methods for taps and splices are disclosed which incorporate a floor pedestal assembly. In the improved receptacle and installation method described therein, contact is established between the flat cable conductors and the receptacle itself by means of insulation displacing contacts on the receptacle assembly. Therefore, no transition from FCC to round wire is required. As the receptacle is rigidly mounted to and positioned above the floor surface, and since the receptacle is commonly constructed of a fractile material, a cover is employed to protect the receptacle therein. As with such secured housings, a blow or other load applied to the cover can be transmitted to the receptacle. This is especially prevalent when the receptacle is mounted to the floor and the cover directly to the receptacle. Since covers of these types are normally secured at a central point, the application, in particular, of rotational or torque type loads to the cover, which in turn are transmitted to the receptacle, may cause damage or dislodgement of the receptacle, thereby interrupting the electrical connection. Also, as the receptacle covers the conductors, damage to the receptacle may result in exposed conductors upon removal of the cover for repairs or replacements.

SUMMARY OF THE INVENTION

It is therefore an object of the present invention to provide an electrical receptacle cover which adequately protects the receptacle from transmitted loads.

It is a further object of the invention to provide a receptacle cover which by its construction will absorb the load of impact and reduce its transmission to the receptacle.

In accordance with the present invention, an electrical receptacle cover is shown which when impacted by an external load, is movable with respect to the receptacle so as to absorb the load of the impact and will transmit only a lesser load to the receptacle itself.

In the preferred embodiment, the electrical receptacle cover includes a centrally located securement aperture. The cover is elastically deformable about the securement point so as to provide a spring-like region which will deflect upon impact so as to absorb the load thereon. External impact directed toward the securement point will flex the deformable region so as to absorb the load of the impact. In addition, rotational or torque type impacts will pivot the cover about the securement point, deflecting the deformable region so that it rides up against the face of the receptacle sockets. This deformation together with the friction developed between the two parallel surfaces will absorb the load of the impact without transmitting the full load to the receptacle.

DETAILED DESCRIPTION OF THE PREFERRED EMBODIMENTS

Figure 1:
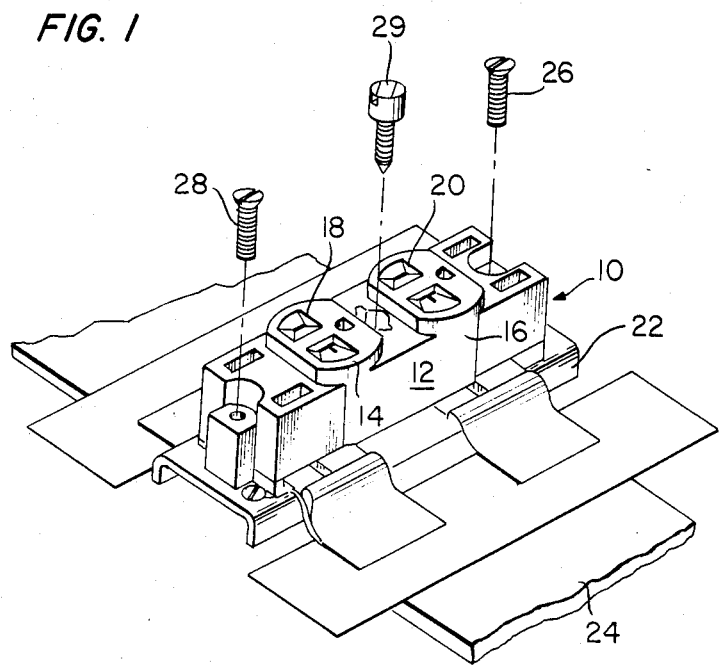
FIG. 1 is a perspective view showing an electrical receptacle, mounted over flat cable, for use with the cover of the present invention.

FIG. 1 shows in perspective an electrical receptacle 10 for use with the cover of the present invention. Receptacle 10 is an insulation displacing receptacle of the type shown and described in the above-mentioned patent applications, U.S. Ser. Nos. 337,661 and 337,662, both filed on Jan. 7, 1982 and commonly assigned herewith. Receptacle 10 has a body portion 12 and depending insulation displacing contacts (not shown). Extending upwardly from body portion 12 are a pair of socket members 14 and 16 having protruding faces 18 and 20 respectively, which lie in a plane substantially parallel to that of the floor surface, for accepting a conventional electrical plug (not shown). Body portion 12 is securely attached to support member 22, which underlies a flat multiconductor cable 24. Upon tight securement of body portion 12 to support member 22 by use of screws 26 and 28, the insulation displacing contacts will pierce the insulation of the flat cable and electrically contact the conductors therein. Grounding screw 29, which is centrally located between screws 26 and 28, is secured to the grounding member of the receptacle 10 to provide continuity of ground. Grounding screw 29 movably secures cover 30 to the receptacle 10 as will be described hereinafter.

The above-described receptacle, used to tap flat conductor cable is shown only by way of example, it being within the contemplation of the present invention to provide a cover for use with other suitable floor mounted receptacles. Further, while the present embodiment shows a twin-type socket having two outlets and a grounding/mounting screw therebetween other receptacle designs and number of outlets can also be envisioned which will accommodate a cover within the scope of this invention.

Figure 2:
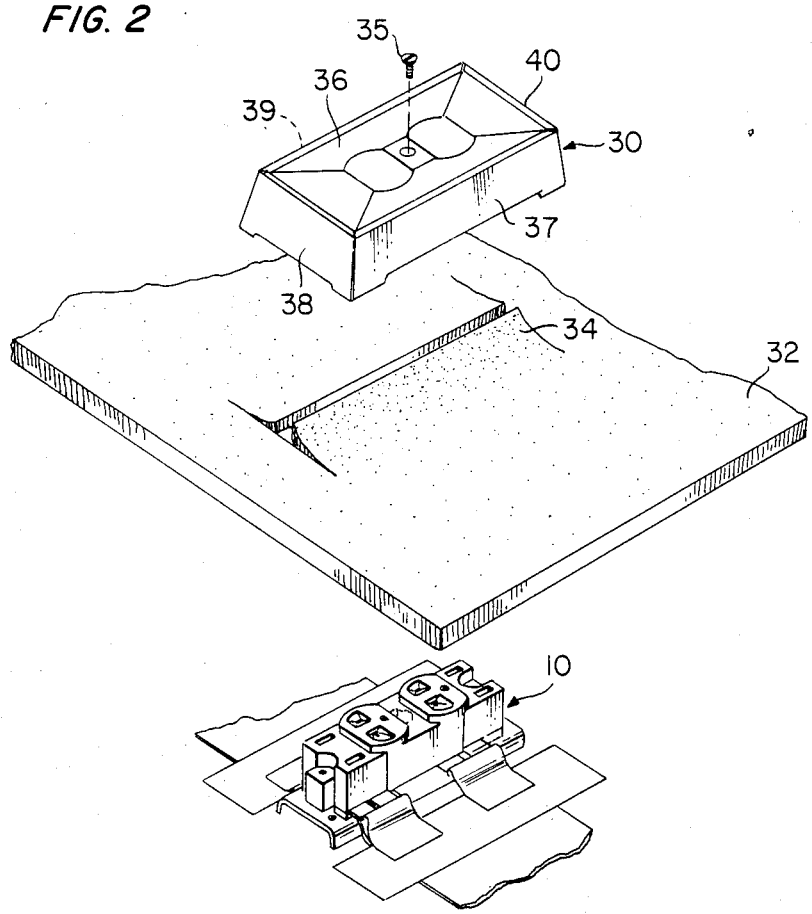
FIG. 2 is an exploded view showing the receptacle of FIG. 1 positioned beneath the cover of the present invention; the overlying carpet being shown therebetween.

Referring now to FIG. 2, receptacle 10 is formed to extend through carpet 32 which is suitably cut in an H-type manner as shown at 34. Cover 30 is adapted to be mounted over the cut carpet 32 and to thereby enclose and protect receptacle 10. A screw 35 is provided for securing the cover 30 to the receptacle 10 via the grounding screw 29 which has internally directed threads for engagement with the threads of the screw 35. Cover 30 is preferably an elongate generally rectangular member having central longitudinal and transverse axes, having an upper face 36 and four depending side walls 37, 38, 39 and 40. Upper face 36 may be substantially flat or incline gradually toward the peripheral edges. In the present embodiment side walls 37-40 depend outwardly from upper face 36, so that the base of cover 30 is larger than its upper extent.

Figure 3:
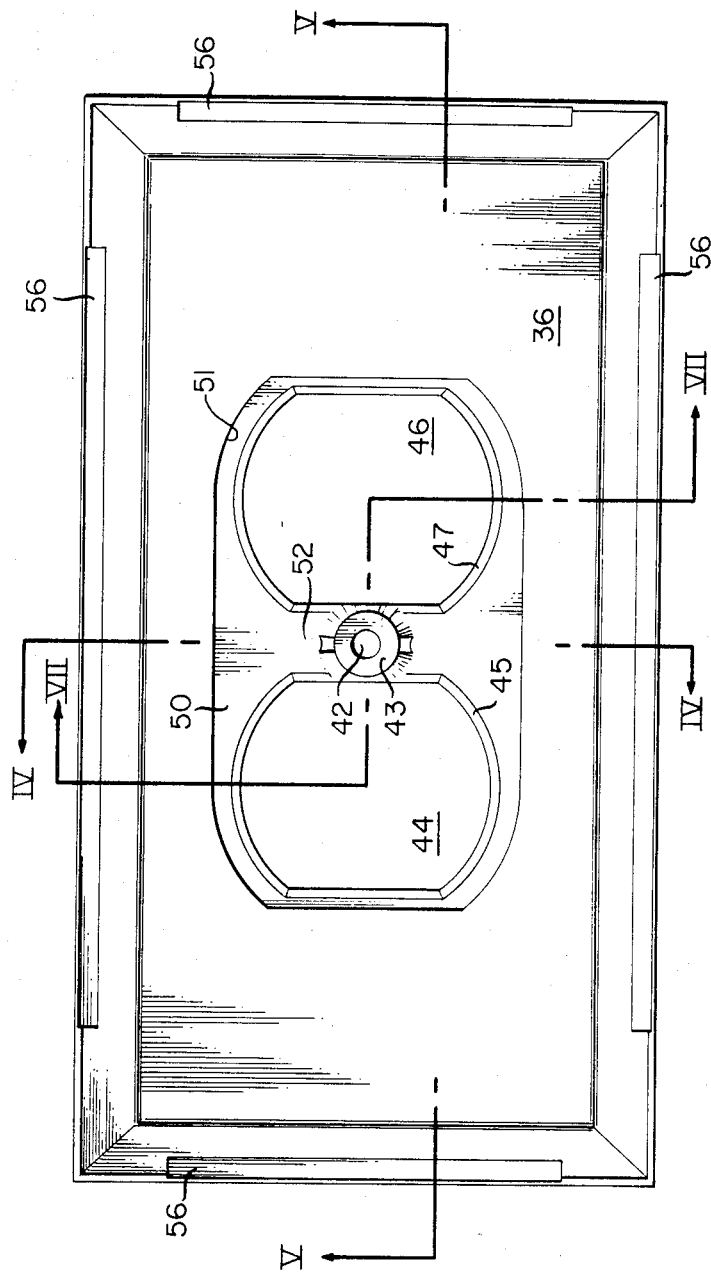
FIG. 3 is a bottom plan view of the cover of FIG. 2.
Figure 4:
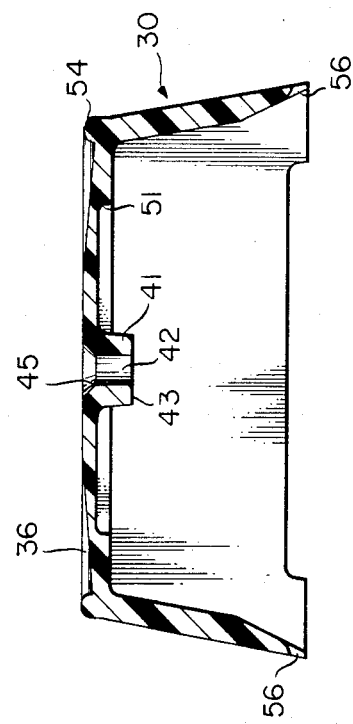
FIGS. 4 and 5 are sectional showings of the cover of FIG. 3 taken along the lines IV—IV and V—V, respectively, with the views inverted from that shown in FIG. 3.
Figure 5:
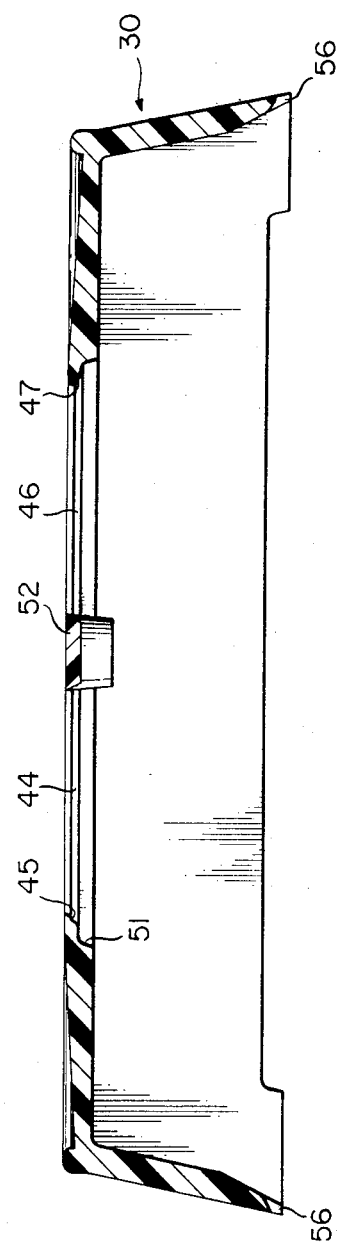

As shown in FIGS. 3, 4 and 5, the upper face 36 includes a securement aperture 42 located at the intersection of the central longitudinal and transverse axes, which aperture 42 accommodates the cover fastening screw 35 (FIG. 2) therein. The opening 42 may have a counter-sink 45 for mating with a counter-sink head on screw 35. Such mounting permits rotative movement of the cover 30 with respect to receptacle 10. Adjacent the aperture 42 is an interiorly directed boss 41 having a lower surface 43. Surface 43 is formed to seat on the head of the grounding screw 29 (FIG. 1) for pivotal contact thereabout upon securement of the cover 30 to the grounding screw 29 by screw 35. Upper face 36 further includes a pair of socket openings 44 and 46 longitudinally aligned and disposed on either side of securement aperture 42. Socket openings 44 and 46 are correspondingly shaped to conform to the sockets 14 and 16 of receptacle 10 so that when properly positioned the faces 18 and 20 of sockets 14 and 16 will be nearly co-planar with upper face 36. A portion of the upper face 36 defines an elastically deformable bridge member 52, the function and purpose of which will be described, which separates the openings 44 and 46 and extends along the cover transverse axis. The opening 42 extends through the bridge member 52. The edges of the upper face 36 adjacent to and in communication with the socket openings 44 and 46 include on the interior surface a slight peripheral chamfer 45 and 47 respectively, which taper away from the openings.

Disposed on the inside surface of upper face 36 is a depressed region 50 which surrounds both socket openings 44 and 46 and which also extends beneath the bridge member 52. Depressed region 50 is constructed to have a thinner wall thickness than the remainder of upper face 36. As cover 30 is constructed preferably of a relatively flexible material, such as a suitable thermoplastic, the thinner walled region 50 is readily deformable and will flex over the flush face of sockets 14 and 16 upon rotative movement of cover 30 on the grounding screw 29. Especially subject to such deformation is the thin walled bridge member 52 which spans the socket openings 44 and 46. Bridge member 52 will flex under application of either a torque-type rotational load or a direct impact along the central axes of the cover. As will be described hereinafter, the energy required to deform the cover, and its movement against the sockets 14 and 16 of receptacle 10 will reduce the effect on the receptacle of a load impacted upon the cover. The outer extent of depressed region 50 includes a rounded edge 51 which serves as a stop surface to prevent over rotation of cover 30 on screw 29. Rounded edge 51 is adapted to engage the upper edge of sockets 14 and 16 after a degree of rotative movement of the cover 30 relative to the receptacle 10.

The outer surface of upper face 36 includes a perimetric rib 54 which extends upwardly therefrom. Perimetric rib 54 serves to protect cover 30 from direct impact from above. Objects which may be dropped on cover 30 strike the rib 54 and reduce the damaging effect to the receptacle 10. In addition, as shown in FIGS. 4 and 5, the outer surface of upper face 36 may be graded away from the center so that water or other liquids which can be spilled on cover 30 will be channeled away from the socket apertures 44 and 46. When employing the steeped or graded cover, rib 54 may include channels or openings (not shown) at the corners of the rectangular upper member to allow the liquid to flow off.

Side walls 37-40 of cover 30 are each tapered downwardly toward the lower cover edge 56 to provide additional flexibility and further reduce the load transmitted to the receptacle upon external impact, especially those loads transmitted along the central longitudinal and transverse axes, as will be described hereinafter. Side walls 37-40 also accommodate internally thereof the cut sections 34 of carpet 32 (FIG. 2).

With the cover described hereinabove, the cover movement which effects a reduction of the load from external impact which is transmitted to the receptacle can best be described with respect to FIGS. 3, 6 and 7.

In the normal position, cover 30 is positioned over receptacle 10 so that the sockets 14 and 16 are in communication with socket openings 44 and 46. In this position, faces 18 and 20 of sockets 14 and 16 will be nearly flush with the upper face 36 of cover 30. As shown in FIG. 2, the cut edges 34 of carpet 32 will be forced up between the sides of receptacle 10 and longitudinal side walls 37 and 39. Cover 30 is then secured to receptacle 10 by grounding screw 35.

Figure 6:
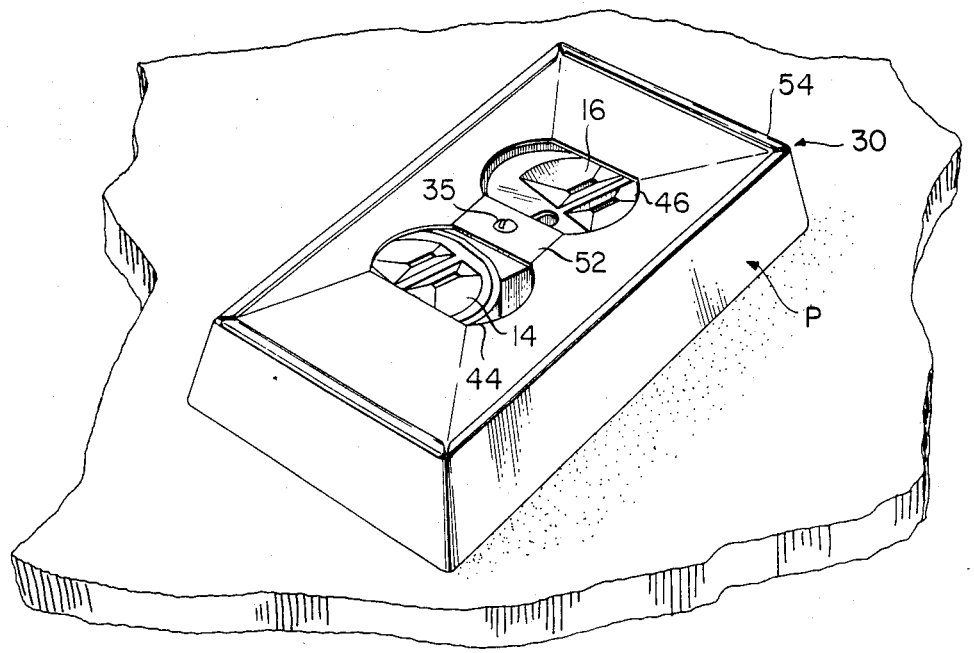
FIG. 6 is a perspective showing of the cover displaced with respect to the receptacle.
Figure 7:
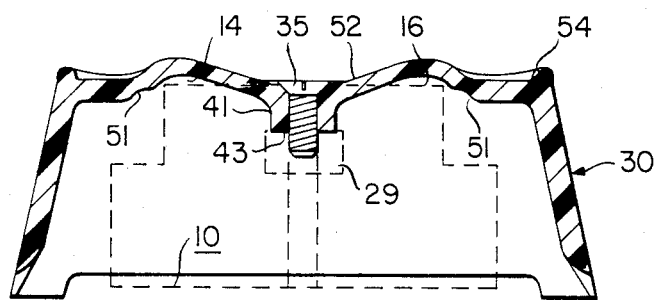
FIG. 7 is a sectional showing of the cover in the displaced position of FIG. 6 as would be seen along the lines VII—VII of FIG. 3.

Upon impact of an external load at a point spaced from the central longitudinal or tranverse axis of cover 20 as, for example a load P as shown in FIG. 6 applied toward the rightward end of the cover 30, a degree of rotational or torque-type stress will be placed on the cover at its securement point at screw 35. This torque-type load will force the cover 30 to pivot about the securement point at screw 35. The socket 16 adjacent the point of impact will contact the champhered edge of the socket opening 46 and will thereby enable the portion of the cover adjacent the point of impact to ride-up onto the face of the adjacent socket. Such movement is permitted as the thinner walled deformable region 50 of the cover inclusive of the bridge member 52 acts as a spring flexing between the contact point of the socket and cover and the securement point at screw 35. FIG. 7 shows the movement of cover 30 with reference to the receptacle (shown in phantom for clarity of illustration) upon an externally directed impact. For simplicity of description, the left half section of FIG. 7 shows the result of a leftsided impact on the adjacent socket 14 and the right side showing a right side impact against the other socket 16. Further for clarity the deflection of the cover 30 is somewhat exaggerated. As shown in FIG. 7, the depressed cover region 50 and the bridge member 52 adjacent the contacted sockets are bowed upwardly between the securement point at screw 35 and the point of contact of such depressed region 50 with sockets 14 and 16. As shown in FIG. 6, it is apparent that in a right-sided impact, as would occur through load P, not only will cover 30 ride up on socket 16 near the point of impact, but also the opposite side of the cover will ride up on the other socket 14 away from the impact. The energy necessary to cause deflection of the deformable portion of the cover and the friction of the surface of depressed region 50 bearing against the face of sockets 14 and 16 serves to reduce the amount of the load which is transmitted to the receptacle itself.

The cover of the present invention will also reduce the transmitted load of a direct impact along the transverse axis. In addition to providing for cantilevered flexing of the side walls 37–40, which will occur in all side impacts due to the thin wall construction of the lower edge 56 of the walls, the present invention also provides for cover deflection along the upper face. A direct side blow along the transverse axis will cause the bridge member 52, between the socket apertures 44 and 46, to bow between the securement point at screw 35 and the rib 54. As above described, the deflection of the bridge member 52, which acts as a spring, serves to absorb the energy of the blow and thereby reduce the transmitted load to the receptacle.

It is apparent in either type impact, that the cover 30, having a resiliently deformable portion, will flex about its secured point at screw 35. Much of the energy of the load applied to the cover 30 will be absorbed or expended in the deflection of the cover, thereby reducing the amount of the load directly transmitted to the receptacle.

By reducing this transmitted load, there will be a lesser risk of damage to or dislodgement of the receptacle itself.

As especially true with the torque-type rotational loads, the cover will attain a position shown in FIG. 6 with the sockets of the receptacle being "off-centered". A user of the receptacle will notice this skewed positioning and will thereby be aware that the cover may have been struck by a load. It will then be up to the user to examine the cover and receptacle and re-align the cover for further use.

Various other changes to the foregoing, specifically disclosed embodiments and practices will be evident to those skilled in the art. Accordingly, the foregoing preferred embodiments are intended in an illustrative and not in a limiting sense. The true spirit and scope of the invention are set forth in the following claims.

What is claimed is:

1. A cover for an electrical receptacle comprising:
   a housing for enclosing said electrical receptacle;
   means for securing said housing to said electrical receptacle for movement relative to said receptacle upon impacting said housing with an external load; and
   a deformable housing face frictionally engageable with said receptacle upon impact of said external load for transferring a load lesser than said external load to said electrical receptacle, said housing face including an opening for accessing therein a socket portion of said receptacle, said housing face including a deformable depressed region adjacent said socket opening for engaging said socket portion of said receptacle upon said external impact on said housing.

2. The cover in accordance with claim 1 wherein said housing is elongate having central longitudinal and transverse axes.

3. The cover in accordance with claim 1 wherein said housing face opening will access a socket face of said socket portion in substantially flush disposition with said housing surface.

4. The cover in accordance with claim 1 wherein said housing is adapted to enclose said receptacle interiorly thereof and wherein said housing face has an interior surface and an oppositely facing exterior surface, and said depressed region is depressed with respect to said interior surface.

5. The cover in accordance with claim 4 wherein said exterior surface of said housing is tapered away from said housing opening.

6. A cover in accordance with claim 1 wherein said deformable region has a reduced thickness with respect to said housing face.

7. A cover for an electrical receptacle comprising:
   a housing of predetermined thickness for enclosing said electrical receptacle;
   means for securing said housing to said receptacle;
   said housing including a resilient portion of reduced thickness for resiliently deforming upon impacting said housing with an external load, and a planar face including said securing means; and
   said resilient portion having a socket aperture for accessing a socket portion of said receptacle, said securing means being disposed adjacent said socket aperture, said resilient portion being adapted for securement to said receptacle and including means for engaging said receptacle to cause resilient deformation of said resilient portion, said engagement means permitting movement of said cover relative to said receptacle.

8. The cover in accordance with claim 7 wherein said resilient portion provides for rotative movement of said housing about said securing means upon said external impact.

9. The cover in accordance with claim 7 wherein said resilient portion is adapted to compressively move upon said external impact.

10. The cover in accordance with claim 7 wherein said planar face has an interior region to be located proximal of said receptacle and includes said resilient portion, said resilient portion being depressed with respect to said planar face.

11. An electrical receptacle cover comprising:
    a housing for enclosing internally thereof an electrical receptacle, said housing including:

(a) a first face having a pair of spaced apart openings therethrough for accessing socket portions of said receptacle;

(b) a spring member disposed on said first face communicating with said spaced apart openings, said spring member comprising a depressed region of the interior of said first face; and (c) securement means for securing said spring member to said receptacle, said spring member adapted to deflect upon impacting said housing with an external load.

12. The cover in accordance with claim 11 wherein said spring member is disposed between said spaced apart openings.

13. The cover in accordance with claim 11 wherein said depressed region surrounds said spaced apart openings.

14. The cover in accordance with claim 13 wherein said securing means provides for pivotal securement of said housing, said housing being pivotally movable about said securing means to cause resilient deformation of said spring member.

* * * * *